United States Patent Office 3,408,424
Patented Oct. 29, 1968

3,408,424
PROCESS OF POLYMERIZING VINYL HALIDE WITH TERPOLYMERS OF 1-MONOOLEFINS AND DIENES
Raymond A. Barkhuff, Jr., Hampden, Mass., assignor to Monsanto Company, a corporation of Delaware
No Drawing. Filed Dec. 30, 1963, Ser. No. 334,620
5 Claims. (Cl. 260—878)

ABSTRACT OF THE DISCLOSURE

Graft blends are disclosed comprising a mixture of (1) about 3 to 75% by weight of a graft copolymer of a vinyl halide monomer upon a terpolymer of ethylene, a 1-monoolefin of at least three carbon atoms such as propylene, and a conjugated or non-conjugated diene, (2) about 97 to 25% by weight of a polymer of the vinyl halide, and (3) less than 15% by weight of said terpolymer. The graft blends are prepared by polymerizing 60 to 98% by weight of vinyl halide or mixtures thereof with ethylenically unsaturated comonomers in the presence of 40 to 2% by weight of the terpolymer.

---

This invention relates to vinyl halide polymers and more particularly the invention relates to vinyl halide graft polymer compositions having improved physical properties.

Vinyl halide and particularly vinyl chloride polymers and copolymers are used extensively in sheets and films, coatings and molded objects. However, articles made from polyvinyl chloride and copolymers thereof are generally considered to be deficient in certain physical properties such as impact strength and low temperature pliability.

In general, the problem of improving low temperature pliability and impact strengths of vinyl halide polymers has been resolved to a fair extent by the addition of liquid plasticizers or by physically blending with macromolecular products such as chloroprene, butadiene-acrylonitrile, butadiene-styrene, chlorinated and sulfochlorinated polyolefins. Unfortunately these methods have generally been successful only at the expense of sacrificing one or more other desirable properties such as rigidity, clarity, tensile strength, solvent resistance, high heat distortion point, chemical resistance, and the like. In end use applications such as the formation of bottles, the necessity for maintaining optimum properties is most acute. As a result, the use of vinyl halide polymers in applications such as bottles, tenacious leather-like materials and the like has been severely limited.

Within fairly recent times, graft polymer products and processes have been developed. These graft polymers are formed from a main chain or trunk polymer onto which are grafted side chains or branches of a different chemical structure. Although various methods of grafting have been published, only a small number of theoretically foreseen graft polymers have been prepared as a practical matter. This is partly because the characteristics of the graft polymer are generally unpredictable and differ substantially from those of the copolymer and partly because graft polymerization is sometimes difficult or impossible under certain conditions even though copolymerization may be readily accomplished.

In accordance with the present invention, it has now been found that polymer blends of polyvinyl halide and a vinyl halide grafted to a terpolymer of ethylene, another member of the ethylene series and a diene can be prepared which have unusual and improved physical properties. In particular, these polymer blends have unusual and improved low temperature toughness, weatherability and flexibility.

Accordingly, it is a principal object of this invention to provide vinyl halide graft polymer compositions having unusual and improved physical properties.

Another object is to provide a method by which to attain the preceding objects.

Other objects of this invention will in part be obvious and will in part appear hereinafter.

These and other objects are attained by the polymerization of vinyl halide monomer in the presence of a terpolymer of ethylene, a member of the ethylene series having a carbon content of at least 3 carbon atoms and a diene.

The following examples are given to illustrate the invention and are not intended as limitations thereof. Unless otherwise specified, quantities are mentioned on a weight basis.

EXAMPLE I

Ten parts of a terpolymer of 50 parts of ethylene, 40 parts of propylene and 10 parts of hexadiene (which is gel free and has a melt index of 4.5 by ASTM D1238–57T procedure) are dispersed in 90 parts of vinyl chloride monomer at a temperature of 70° C. The resulting dispersion is then charged to an air evacuated pressure vessel containing 150 parts water, 0.35 part methylcellulose (5.5–7.0 hydroxy propyl, 22–23% methoxy content, viscosity of 2% aqueous solution at 20° C. equal 100 cps.) and 0.25 part lauroyl peroxide.

Polymerization is carried out under agitation at 60° C. for 16 hours. After venting of small quantities of unconverted monomer, 95 parts of a homogeneous granular resin are obtained. The dry resin has a specific viscosity of about 0.38 (0.4 gram in 100 ml. cyclohexanone at 25° C.).

EXAMPLE II

The process of Example I is repeated three separate times using the same procedure and ingredients of Example I except that the ratio of terpolymer to vinyl chloride monomer charged is varied as follows for each separate run:

| Run No. | Parts Terpolymer | Parts Vinyl Chloride Monomer |
|---|---|---|
| 1 | 20 | 80 |
| 2 | 40 | 60 |
| 3 | 10 | 90 |

In each instance the conversion of monomer to polymer is over 90% producing a dry resin.

EXAMPLE III

The process of Example I is repeated six separate times using the same procedure and proportion of terpolymer to vinyl chloride monomer charged except that the respective proportions of ethylene, propylene and hexadiene in the terpolymer are as follows for each of the six runs:

TERPOLYMER

| Run No. | Proportion of Ethylene | Proportion of Propylene | Proportion of Hexadiene |
|---|---|---|---|
| 1 | 55 | 40 | 5 |
| 2 | 30 | 60 | 10 |
| 3 | 50 | 40 | 10 |
| 4 | 40 | 50 | 10 |
| 5 | 60 | 25 | 15 |
| 6 | 70 | 25 | 5 |

In each instance the conversion of monomer to polymer is over 90% producing a dry resin.

EXAMPLE IV

The process of Example I is repeated using the same procedure and ingredients except that 10 parts of a terpolymer of 40 parts of ethylene, 50 parts of isobutylene and 10 parts of hexadiene (melt index of terpolymer= 1.7 by ASTM D1238–57T procedure) are used in place of the terpolymer of Example I. The conversion of monomer to polymer is over 90% with good grafting efficiency.

EXAMPLE V

The process of Example I is repeated using the same procedure and ingredients except that 10 parts of a terpolymer of 40 parts of ethylene, 50 parts of pentene and 10 parts of hexadiene (melt index of terpolymer= 2.9 by ASTM D1238–57T procedure) are used in place of the terpolymer of Example I. The conversion of monomer to polymer is over 90% with good grafting efficiency.

EXAMPLE VI

The process of Example I is repeated using the same procedures and ingredients except that 10 parts of a terpolymer of 40 parts of ethylene, 50 parts propylene and 10 parts of cyclopentadiene (which is free of gel and has a melt index of 1.6 by ASTM D1238–57T procedure) are used in place of the terpolymer of Example I. The conversion of monomer to polymer is over 90% with good grafting efficiency.

EXAMPLE VII

The process of Example I is repeated using the same procedures and ingredients except that 10 parts of a terpolymer of 50 parts of ethylene, 40 parts of propylene and 10 parts of butadiene (which is free of gel and has a melt index of 2.0 by ASTM D1238–57T procedure) are used in place of the terpolymer of Example I. The conversion of monomer to polymer is over 90% with good grafting efficiency.

EXAMPLE VIII

One hundred parts of the resin obtained in Example I are mixed with 2 parts of a commercial barium-cadmium soap stabilizer on a mill roll at a stock temperature of 360° F. Portions of the milled sheet taken at different intervals of time are molded into slabs one-eighth inch thick and cut into test specimens. For tensile and heat distortion tests, the specimens measure one half by one eighth by five inches in length with the tensile specimens further machined to a ¼″ x 2″ dog bone shape as shown in ASTM D638–58T. The specimens for impact testing measure one half by one eighth by two and one-half inches and are taken directly from the mill rolls without molding. A physical mixture or mechanical blend of polyvinyl chloride homopolymer and the same terpolymer used to prepare the graft blend of Example I in equivalent proportions are milled for the purposes of comparison. ASTM test results as shown in Table I are as follows:

TABLE I

| | Graft Blend | Mechanical Blend |
| --- | --- | --- |
| Izod Impact Strength (ft. lbs./in.): | | |
| 5 minutes milling at 73° F | 10.1 | 0.7 |
| 15 minutes milling at 73° F | 16.2 | 1.0 |
| 25 minutes milling at 73° F | 14.5 | 0.5 |
| Heat Distortion Temp.,° C | 69 | 68 |
| Tensile Strength, p.s.i. yield | 5,800 | 4,900 |
| Percent Elongation, yield | 3.2 | 4.1 |
| Percent Elongation, fail | 70 | 120 |
| Tensile Modulus, p.s.i | 3.0×10⁵ | 2.5×10⁵ |

As is apparent from Table I above, superior property results are obtained on the graft blend as opposed to the mechanical blend even though the proportions of the various ingredients are the same.

EXAMPLE IX

One hundred parts of the resin obtained in Example I are mixed with 2 parts of a commercial barium-cadmium soap stabilizer on a mill roll at a stock temperature of 360° F. Portions of the milled sheet taken at different intervals of time are molded into slabs one-eighth inch thick and cut into test specimens. For tensile and heat distortion tests, the specimens measure one half by one eighth by five inches in length with the tensile specimens further machined to ½″ x 2″ dog bone shape as shown in ASTM D638–58T. The specimens for impact testing measure one half by one eighth by two and one-half inches and are taken directly from the mill rolls without molding. A graft blend prepared by polymerizing vinyl chloride monomer in the presence of polyethylene according to the procedure set forth in U.S. Patent 2,947,719 and in equivalent monomer: polymer proportions as that used to prepare the blend of Example I is milled for the purposes of comparison. ASTM test results as shown in Table II are as follows:

TABLE II

| | Ethylene Propylene Hexadiene Terpolymer Graft Blend | Polyethylene Graft Blend |
| --- | --- | --- |
| Izod Impact Strength (ft. lbs./in.): | | |
| 5 minutes milling at 73° F | 10.1 | 0.8 |
| 15 minutes milling at 73° F | 16.2 | 1.1 |
| 25 minutes milling at 73° F | 14.5 | 1.3 |
| 15 minutes milling at 0° F | 10.5 | 0.8 |
| Heat Distortion Temp.,° C | 69 | 68 |
| Tensile Strength, p.s.i. yield | 5,800 | 5,100 |
| Percent Elongation, yield | 3.2 | 2.7 |
| Percent Elongation, fail | 70 | 23 |
| Tensile Modulus, p.s.i | 3.0×10⁵ | 2.6×10⁵ |
| Percent Transmission at 680mμ | 85 | 40 |

The superior low temperature toughness of the ethylene:propylene:hexadiene terpolymer graft over the polyethylene graft is indicated in Table II. The superior toughness at lower temperatures is due to the fact that the terpolymer graft has a lower Tg than the polyethylene graft. A rubber in order to perform as a toughening agent at low temperatures should have the lowest possible Tg. In addition, it should be noted that the percent transmission result obtained on the terpolymer graft is quite a bit higher than the result obtained on the polyethylene graft.

EXAMPLE X

One hundred parts of the resin obtained in Example I are mixed with 2 parts of a commercial barium-cadmium soap stabilizer on a mill roll at a stock temperature of 360° F. Portions of the milled sheet taken at different intervals of time are molded into slabs one-eighth inch thick and cut into test specimens. For tensile and heat distortion tests, the specimens measure one half by one eighth by five inches in length with the tensile specimens further machined to a ¼″ x 2″ dog bone shape as shown in ASTM D638–58T. The specimens for impact testing measure one half by one eighth by two and one-half inches and are taken directly from the mill rolls without molding. A graft blend prepared by polymerizing vinyl chloride monomer in the presence of a copolymer of 60 parts ethylene and 40 parts of propylene, in equivalent monomer:polymer proportions as that used to prepare the blend of Example I is milled for the purposes of comparison. ASTM test results as shown in Table III are as follows:

TABLE III

| | Ethylene Propylene Hexadiene Terpolymer Graft Blend | Ethylene Propylene Copolymer Graft Blend |
| --- | --- | --- |
| Izod Impact Strength (ft. lbs./in.): | | |
| 5 minutes milling at 73° F | 10.1 | 2.8 |
| 15 minutes milling at 73° F | 16.2 | 10.1 |
| 25 minutes milling at 73° F | 14.5 | 9.2 |
| 15 minutes milling at 0° F | 10.5 | 7.2 |
| Heat Distortion Temp.,° C | 69 | 67 |
| Tensile Strength, p.s.i. yield | 5,800 | 6,000 |
| Percent Elongation, yield | 3.2 | 4.2 |
| Percent Elongation, fail | 70 | 80 |
| Tensile Modulus, p.s.i | 3.0×10⁵ | 2.8×10⁵ |

The superior toughness of the ethylene:propylene:hexadieneterpolymer graft over the ethylene:propylene copolymer graft at both medium and low temperatures is indicated in Table III.

The graft blends formed in the practice of the present invention are those wherein 60 to 98% by weight of an ethylenically unsaturated monomer is polymerized in the presence of 40 to 2% by weight of terpolymer of ethylene, a member of the ethylene series having a carbon content of at least 3 carbon atoms and a diene and more preferably where 80 to 96% by weight of an ethylenically unsaturated monomer is polymerized in the presence of 20 to 4% by weight of a terpolymer of ethylene, a member of the ethylene series having a carbon content of at least 3 carbon atoms and a diene.

The ethylene series is considered to be that group of unsaturated hydrocarbons of the general formula $C_nH_{2n}$ which contain one double bond such as ethylene, propylene, butylene, isobutylene, amylene and the like and including mixtures of the same. The terpolymer employed in the present invention contains copolymerized ethylene and it is intended that a second member of the ethylene series, other than ethylene, be present. The second member, therefore, has the general structural formula $C_nH_{2n}$ with $n$ representing a numeral of 3 or more. For optimum low temperature properties $n$ should range between 3–8, that is, this member of the ethylene series has a carbon content between 3 to 8 carbon atoms.

The ethylenically unsaturated monomer used in effecting the graft polymerization comprises at least 80% by weight of vinyl halide and may include up to 20% of other ethylenically unsaturated monomers copolymerizable therewith. Thus, vinylidene halide, vinyl esters of organic acids, acrylonitrile, acrylates, methacrylates, maleates, fumarates and other unsaturated organic compounds can be used as comonomers. In addition, polymers made from vinyl halide and two or more comonomers are also applicable. Of the four vinyl halides, vinyl chloride is preferred.

The graft polymer can be conveniently prepared by dispersing the terpolymer in the vinyl halide monomer and then polymerizing the monomer. Although suspension polymerization is the preferred procedure with respect to production volume, ease of recovery and physical form of resins, this invention is not restricted thereto. Polymerization may also be carried out by mass, solution, or emulsion techniques.

Briefly describing the preferred suspension polymerization process, water, suspending agent and terpolymer are charged to an agitated pressure vessel. The vessel is sealed and substantially evacuated of air to substantially eliminate oxygen after which cold vinyl monomer is added and the resulting mixture agitated at temperatures anywhere between 20–100° C. to disperse the terpolymer in the vinyl monomer. After the terpolymer is substantially dispersed, the batch is cooled to a polymerization temperature of 10 to 80° C. and more preferably 45–65° C., the initiator is added and the polymerization allowed to proceed until the pressure drops below 60 p.s.i.g. The remaining monomer is then vented off and the resin recovered by centrifuging and drying. The estimated percent yield will generally be above 90%.

The amount of water charged to the process is generally adjusted to give maximum vessel productivity consistent with a low slurry viscosity for maintaining adequate heat transfer and storage. As a result, the amount of water charged will generally vary between 100 to 250 parts by weight per 100 parts of total monomer charged. The initiator is generally varied within narrow ranges to obtain a polymerization cycle of 16 hours or less. Operation in accordance with the above process will provide graft polymerization in which vinyl halide chains are chemically bound to the terpolymer backbone. It is preferred that the terpolymer be dispersed in the vinyl halide monomer before polymerization is started. Although if a portion of the terpolymer backbone is present as a very fine suspension grafting can still be effected. Generally, about a 75 minute dispersing period is sufficient at 60° C. If large rubbery lumps are evident in the final product, the dispersing period or temperature should be increased.

When vinyl halide is polymerized in the presence of a terpolymer of ethylene, a member of the ethylene series having a carbon content of at least three carbon atoms and a diene, the resultant product is a mixture of (1) terpolymer backbone chains with pendant polyvinyl halide chains (the graft polymer) (2) polyvinyl halide homopolymer and (3) a small amount of unchanged terpolymer. The proportion of grafted material in the mixture will in general depend for the most part on the ratio of the monomer and terpolymer starting materials. Where 60 to 98% by weight of an ethylenically unsaturated monomer is polymerizad in the presence of 40 to 2% by weight of a terpolymer of ethylene, a member of the ethylene series having a carbon content of at least 3 carbon atoms, and a diene in accordance with the practice of this invention, the resultant graft product will comprise a mixture of (1) about 3 to 75% by weight of the chemically-combined vinyl halide polymer and terpolymer (the grafted polymer), (2) about 97 to 25% by weight of polyvinyl halide homopolymer, and (3) less than 15% by weight of unchanged terpolymer. These proportions will vary depending on relative quantities of starting materials and the specific polymerization conditions used.

The graft polymeric material obtained in the practice of this invention may also be physically admixed with other thermoplastic polymer compositions. A particularly useful composition for the formation of high or medium impact material that can be extruded or calendered at relatively high rate to give high quality products, is one where 20–100% by weight of the graft blend formed in the practice of this invention is physically admixed with 80–0% by weight of polymers prepared from ethylenically unsaturated monomers such as polyvinyl halide homopolymer, polyvinyl halide copolymers, polyvinylidene halide, polymethyl methacrylate, styrene-acrylonitrile, methyl-styrene-acrylonitrile, methyl styrene-styrene-acrylonitrile, butadiene-acrylonitrile interpolymers and the like and including mixtures of the same. Particularly preferred is polyvinyl halide homopolymer and more particularly polyvinyl chloride homopolymer.

With respect to the terpolymer of the present invention, the proportion of ethylene in the terpolymer will generally range between 35 to 75% by weight based on the total weight of the terpolymer and the proportion of the member of the ethylene series having a carbon content of at least three carbon atoms will generally range between 60 to 10% by weight based on the total weight of the terpolymer. The diene constituent has two double bonds and is selected from the group consisting of unsaturated aliphatic hydrocarbons having the general formula $C_nH_{2n-2}$ wherein $n$ has a value of 4–8, alicyclic hydrocarbons having the general formula $C_{n'}H_{n'-4}$ wherein $n'$ has a value of 5–12, and mixtures of the same. In general, the proportion of combined diene in the terpolymer will range between 0.2 to 35% by weight and more preferably 0.5 to 15% by weight based on the total weight of the terpolymer for better weatherability.

The terpolymer may be interpolymerized from the monomers of ethylene, the member of the ethylene series having a carbon content of at least three carbon atoms and the diene by conventional polymerization techniques such as by mass, solution, or emulsion polymerization methods.

The graft polymerization may be accelerated by heat, irradiation and polymerization catalysts.

Catalysts which have been found to be useful for suspension polymerization are monomer-soluble organic peroxides, e.g., benzoyl peroxide, lauroyl peroxide, 2,4-dichlorobenzoyl peroxide, acetyl peroxide, acetyl benzoyl peroxide, or other unsymmetrical peroxides, t-butyl hydroperoxide, alkyl percarbonates, perborates, azo compounds, and mixtures of the same. The quantity and type of catalyst will generally be varied depending on the particular process used, initiator activity, and on the quantity of monomer and diluent. The polymerizations can also be advantageously carried out in the presence of chain regulators such as chlorinated hydrocarbons, alcohols, aldehydes, etc.

Optional additives, such as stabilizers, fillers, colorants, processing aids, lubricants, coplasticizers, etc., can be incorporated into the polyblends if desired.

Among the processing aids and co-plasticizers for incorporation into the polyblends are, e.g., methyl methacrylate polymers, styrene-acrylonitrile copolymers, styrene-methyl methacrylate copolymers, epoxy components, chlorinated paraffins, etc.

The products of this invention are rigid or semi-rigid blends which are useful in preparing rigid and semi-rigid sheets, tubes and molded objects having an optimum balance of high impact and tensile strengths. In particular, these blends are extremely useful where good low temperature properties are required. They are also characterized by good flow properties at relatively low processing temperatures, high heat distortion point and excellent chemical and solvent resistance. These properties make the products of this invention excellent for many outdoor applications such as corrugated and flat roofing, siding, etc. Examination of samples of the compositions withdrawn from a roll mill after milling times of 5, 10 and 25 minutes shows that they can withstand relatively long milling times without undergoing thermal degradation. They may be calendered, injection molded, extruded, or otherwise fabricated to form rigid sheets, pipes, structural pieces, wire coatings, etc. When desirable, they can be reinforced, e.g., with asbestos fibers.

It is obvious that many variations may be made in the products and processes set forth above without departing from the spirit and scope of this invention.

What is claimed is:

1. A process of preparing a graft blend comprising the steps of (1) dispersing 40 to 2% by weight of a terpolymer of from about 35 to 75% by weight of ethylene, from about 60 to 10% by weight of a member of the ethylene series having a chain of between 3 and 8 carbon atoms, and from about 0.2 to 35% by weight of a diene selected from the group consisting of unsaturated aliphatic hydrocarbons having the general formula $C_nH_{2n-4}$ wherein $n$ has a value of from 4 to 8, alicyclic hydrocarbons having the general formula $C_{n'}H_{n'-4}$ wherein $n'$ has a value of from 5 to 12, and mixtures thereof, in 60 to 98% by weight of an ethylenically unsaturated monomer containing from 80 to 100% by weight of vinyl halide and from 0 to 20% by weight of at least one other ethylenically unsaturated monomer copolymerizable therewith; (2) admixing, in the presence of a suspending agent, the dispersion resulting from step (1) with an amount of water ranging between 100 and 250 parts by weight per 100 parts of said ethylenically unsaturated monomer while maintaining the substantial absence of oxygen, said water being at a temperature of from 20 to 100° centigrade; (3) adding a polymerization initiator to the suspension resulting from steps (1) and (2); (4) agitating said suspension at a temperature of 10–80° centigrade to polymerize the monomers therein; and (5) recovering therefrom a blend comprising a mixture of about 3 to 75% by weight of a graft copolymer of said ethylenically unsaturated monomer upon the terpolymer, about 97 to 25% by weight of a polymer of the ethylenically unsaturated monomer, and less than 15% by weight of said terpolymer.

2. The process of claim 1 wherein said vinyl halide is vinyl chloride.

3. The process of claim 1 wherein said diene is hexadiene.

4. The process of claim 1 wherein said diene is cyclopentadiene.

5. The process of claim 1 wherein said member of the ethylene series is propylene.

References Cited

UNITED STATES PATENTS

| | | | |
|---|---|---|---|
| 3,236,917 | 2/1966 | Natta et al. | 260—878 |
| 3,271,477 | 9/1966 | Kresge | 260—877 |
| 2,933,480 | 4/1960 | Gresham et al. | 260—80.5 |
| 3,100,757 | 8/1963 | Smyers et al. | 260—878 |

FOREIGN PATENTS

| | | |
|---|---|---|
| 852,042 | 10/1960 | Great Britain. |

OTHER REFERENCES

Gladding et al., A New Hydrocarbon Elastomer, Ind. & Eng. Chem., Product Research and Development, vol. 1, No. 2, June 1962, pp. 65–69.

GEORGE F. LESMES, *Primary Examiner.*